US009909538B2

(12) United States Patent
Ghannam et al.

(10) Patent No.: US 9,909,538 B2
(45) Date of Patent: Mar. 6, 2018

(54) VAPOR BLOCKING VALVE MOUNTING SYSTEM

(71) Applicant: FORD GLOBAL TECHNOLOGIES, LLC, Dearborn, MI (US)

(72) Inventors: Mahmoud Y. Ghannam, Canton, MI (US); Swadad A. Carremm, Canton, MI (US); Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 294 days.

(21) Appl. No.: 14/963,657

(22) Filed: Dec. 9, 2015

(65) Prior Publication Data

US 2017/0167445 A1 Jun. 15, 2017

(51) Int. Cl.
*B60R 11/00* (2006.01)
*F02M 25/08* (2006.01)

(52) U.S. Cl.
CPC .... *F02M 25/0836* (2013.01); *Y10T 137/6881* (2015.04)

(58) Field of Classification Search
CPC ......... Y10T 137/7833; Y10T 137/6881; Y10T 137/0486; Y10T 403/7182; Y10T 403/7188; Y10T 137/6855; F02M 25/0836
USPC ...................................... 137/351; 403/92, 96
See application file for complete search history.

(56) References Cited

U.S. PATENT DOCUMENTS 2,817,866 A * 12/1957 Don ........................ A46B 17/02 15/146
5,435,511 A * 7/1995 Hsu ....................... A01K 63/006 248/206.3
6,568,874 B1 * 5/2003 Sommerfeld ......... F16B 7/0493 403/321
6,709,182 B1 * 3/2004 De Jong ................. F16B 37/02 403/12
6,966,330 B2 11/2005 Frohwein
8,556,643 B2 10/2013 Pevoteaux et al.
(Continued)

FOREIGN PATENT DOCUMENTS

CN 202479788 U 10/2012
DE 102006025706 A1 12/2007
(Continued)

*Primary Examiner* — Jessica Cahill
(74) *Attorney, Agent, or Firm* — James Dottavio; MacMillan, Sobanski & Todd, LLC

(57) ABSTRACT

A vapor blocking valve for a fuel vapor recovery system is mounted with a two-piece bracket having a base member and a clip member. The base member fixedly mounts on a vehicle structure. At least two bendable wings extend from the base member which are bendable toward one another to a release position. The clip member has an aperture receiving the wings and a clamp receiving the vapor blocking valve. The wings and aperture have a matching profile for selectably locking the clip member at one of a plurality of rotational orientations when the wings are at the rest position. The clip member is movable between rotational orientations with the wings bent to the release position. Consequently, re-orientation of the vapor blocking valve can be accommodated without any changes to the mounting bracket or the structural component to which the bracket attaches.

7 Claims, 5 Drawing Sheets

(56) References Cited

U.S. PATENT DOCUMENTS

| | | | | |
|---|---|---|---|---|
| 8,925,153 | B1 * | 1/2015 | McGrath | E05D 11/1007 16/326 |
| 2004/0179891 | A1 * | 9/2004 | Watkins | F16C 11/10 403/96 |
| 2006/0285915 | A1 * | 12/2006 | Dellach | F16C 11/10 403/92 |
| 2008/0006248 | A1 | 1/2008 | Rockwell et al. | |
| 2008/0173358 | A1 * | 7/2008 | Guldi | G05D 11/133 137/351 |
| 2011/0260011 | A1 * | 10/2011 | Yu | F16L 3/2235 248/75 |
| 2012/0318935 | A1 * | 12/2012 | Benedetti | F16L 3/1075 248/74.1 |
| 2013/0092812 | A1 * | 4/2013 | Courbon | B60R 1/0612 248/478 |
| 2014/0026866 | A1 | 1/2014 | Pifher et al. | |
| 2014/0076420 | A1 * | 3/2014 | Westermann | F16L 3/1075 137/351 |

FOREIGN PATENT DOCUMENTS

| | | | | |
|---|---|---|---|---|
| EP | 2381553 | A2 * | 10/2011 | B60R 16/0215 |
| EP | 2792920 | A1 | 10/2014 | |
| FR | 2833890 | A1 * | 6/2003 | B60K 15/03 |
| GB | 1446542 | A * | 8/1976 | F15B 21/041 |

* cited by examiner

VAPOR BLOCKING VALVE MOUNTING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to evaporative fuel recovery systems, and, more specifically, to a mounting system for a vapor blocking valve.

Onboard Refueling Vapor Recovery (ORVR) is a vehicle emission control system that captures fuel vapors from the vehicle fuel tank during refueling. The tank and fill pipe are designed so that when refueling the vehicle, fuel vapors in the tank travel to an activated carbon canister which adsorbs the vapor. When the engine is in operation, it draws the gasoline vapors into the engine intake manifold to be burned.

Vapor lines (i.e., conduits) are used to convey fuel vapor between the fuel tank, carbon canister, engine, and various in-line valves that control the vapor flow. One such valve is the vapor blocking valve (VBV) which is typically a discrete component mounted to the vehicle frame between the fuel tank and the carbon canister. A plastic-molded mounting bracket is typically used with a clip on one side for holding the VBV and attachment pins on the other side for inserting into corresponding holes in a sheet metal support panel of the frame. The bracket and mounting holes in the sheet metal are configured according to a design layout of the vapor system within the vehicle. For example, clamp arms hold the VBV at a particular orientation to align it with the vapor lines to which it attaches.

The development of a design for each new vehicle model involves an iterative engineering process. Preliminary designs are used to create prototype vehicles for testing and evaluation purposes. Based on these results, the designs may be modified. For example, vehicle performance during crash safety testing may dictate repositioning of ORVR components. In order to accommodate a new orientation of the VBV, the bracket and/or the placement of mounting holes in the vehicle frame sheet metal would have to be redesigned. Development of a new design for the mounting system results in added development time and associated costs. It would be desirable to minimize such re-development time and cost and to provide flexibility and reusability in mounting system design and development.

SUMMARY OF THE INVENTION

In one aspect of the invention, a mounting system for a vapor blocking valve is comprised of a base member and a clip member. The base member comprises a baseplate having a first surface adapted to bear against a vehicle structure and having an opposed second surface. The base member has a lock pin and an alignment pin extending from the first surface which are adapted to engage holes in the vehicle structure to retain the baseplate. At least two bendable wings extend from the second surface, wherein the wings have a rest position, and wherein the wings are bendable toward one another to a release position. The clip member comprises an adjustment plate engaging the second surface and having an aperture receiving the wings. The clip member further comprises a clamp fixed to the adjustment plate and configured to snap onto the vapor blocking valve. The wings and the aperture have a matching profile for selectably locking the clip member at one of a plurality of rotational orientations when the wings are at the rest position. The clip member is movable between rotational orientations with the wings bent to the release position. Consequently, changes made to a fuel vapor recovery system during development of a vehicle which require re-orientation of the vapor blocking valve can be accommodated without any changes to the mounting bracket or the structural component to which the bracket attaches.

DETAILED DESCRIPTION OF PREFERRED EMBODIMENTS

Figure 1:
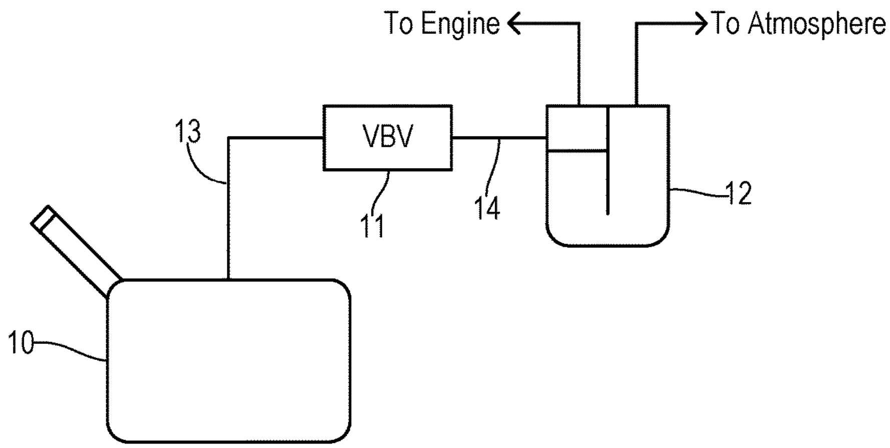
FIG. 1 is a block diagram of a vehicle having an Onboard Refueling Vapor Recovery system.

Referring to FIG. 1, a motor vehicle fuel system of the invention may include a fuel tank 10, a vapor blocking valve (VBV) 11, and a carbon canister 12. A vapor line 13 interconnects VBV 11 with tank 10, and a vapor line 14 interconnects VBV 11 with canister 12. Additional valves (not shown) selectably conduct vapor from canister 12 to the engine or to atmosphere, as known in the art.

Figure 2:
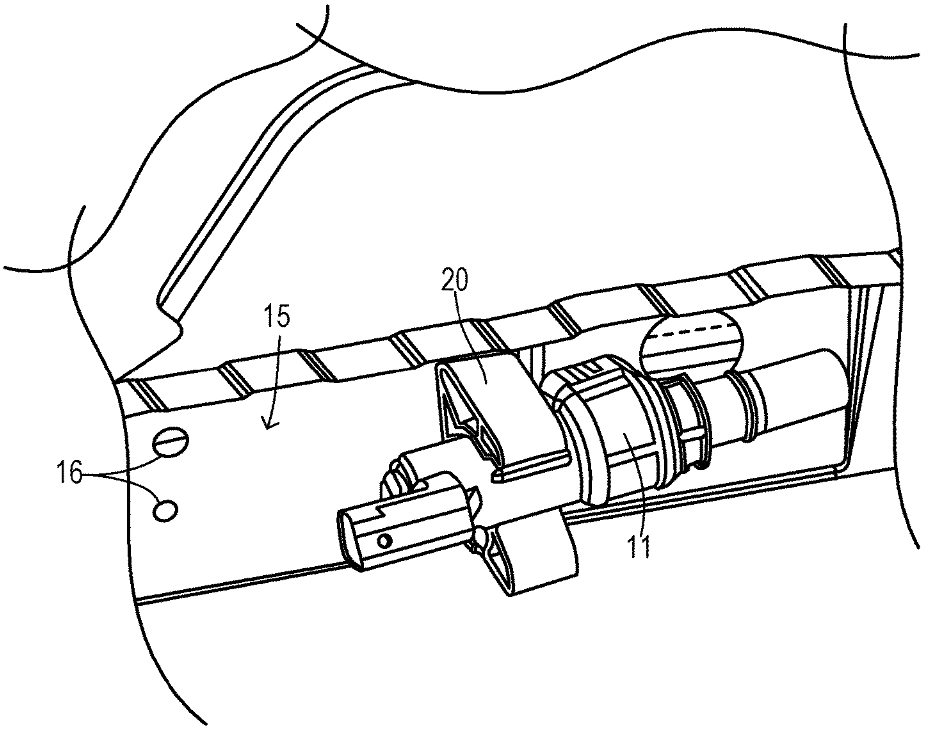
Fig. 2 (Prior Art)
FIG. 2 is a perspective view of a prior art mounting bracket holding a vapor blocking valve.

VBV 11 may typically be a solenoid valve that is controlled electronically and which is mounted remotely from tank 10 and canister 12 on a frame element or other component of a vehicle body structure. FIG. 2 shows a frame element 15 formed from a stamped sheet metal panel. Various holes 16 may be punched into the sheet metal panel for mounting various components. One such component is a molded bracket 20 that attaches to frame element 15 and has a snap-in clamp for receiving VBV 11.

Figure 3:
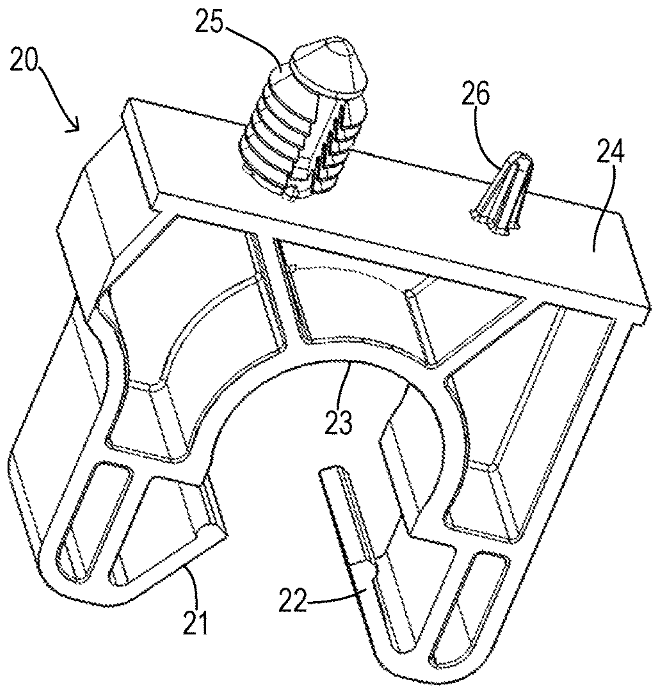
Fig. 3 (Prior Art)
FIG. 3 is a perspective view of a prior art mounting bracket.
Figure 4:
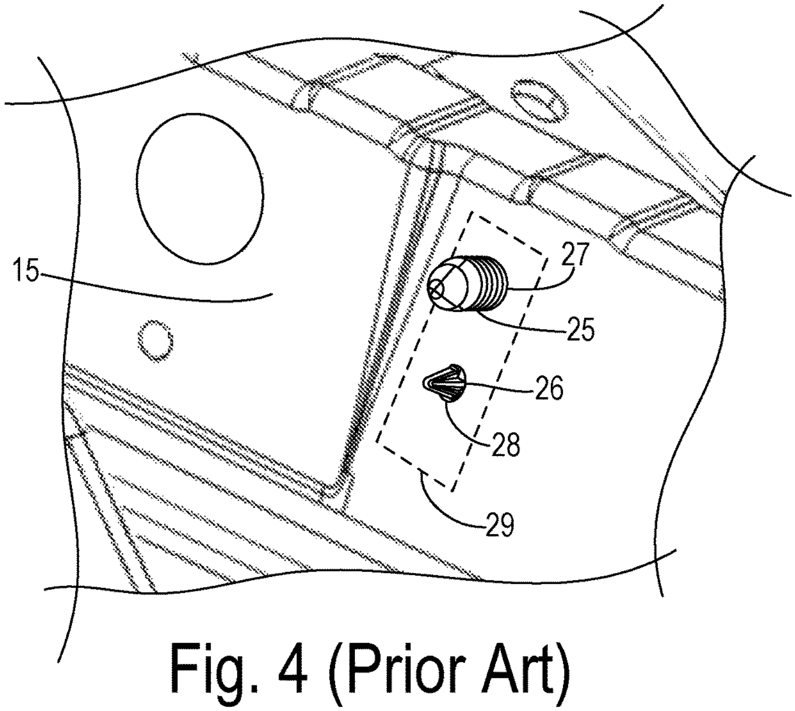
Fig. 4 (Prior Art)
FIG. 4 is a perspective view of the attachment pins of the bracket of FIG. 3 received in mounting holes in the vehicle sheet metal.

As shown in FIG. 3, bracket 20 includes a pair of snap arms 21 and 22 disposed at an entrance to a semi-cylindrical slot 23 adapted to retain VBV 11 with its longitudinal axis parallel with the axis of slot 23. A pair of mounting pins 25 and 26 extend from a bottom surface 24 of bracket 20. Pin 25 is a Christmas tree type of locking pin having a ribbed shank wherein the ribs or fins are individually bendable when inserted into a mounting hole 27 (FIG. 4) such that after passing through mounting hole 27 they spring back to their original positions to grasp an opposite side of sheet metal panel 15. Pin 26 enters a smaller hole 28 and acts as an anti-rotation feature, whereby bracket 20 is held in place such that bottom surface 24 maintains a fixed footprint 29.

Figure 5:
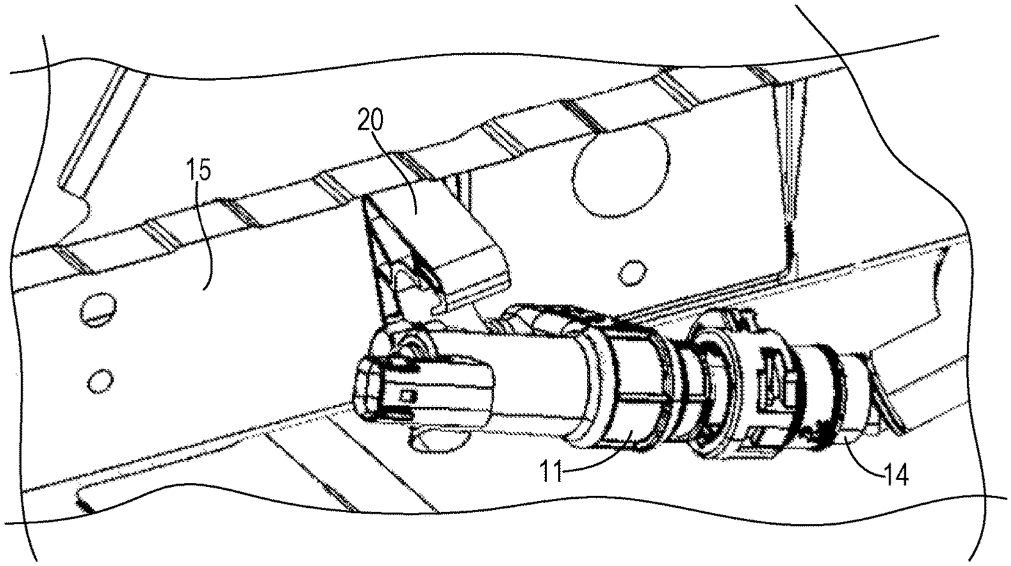
FIG. 5 depicts a reorientation of the vapor blocking valve as necessitated during development of a design for a vehicle model which is incompatible with the original layout of the bracket.

FIG. 5 shows a modified orientation of VBV 11 after modifications to the design of a vehicle model are made in which the path of conduit 14 leading to VBV 11 has been changed. Due to the modified orientation of VBV 11, bracket 20 according to the original design can no longer be used. Under the prior art, bracket 20 would be re-designed and/or locations of the mounting holes would be changed. The creation of a re-design for the mounting system consumes engineering resources in both design and testing, and it adds further delays to the vehicle development process.

Figure 6:
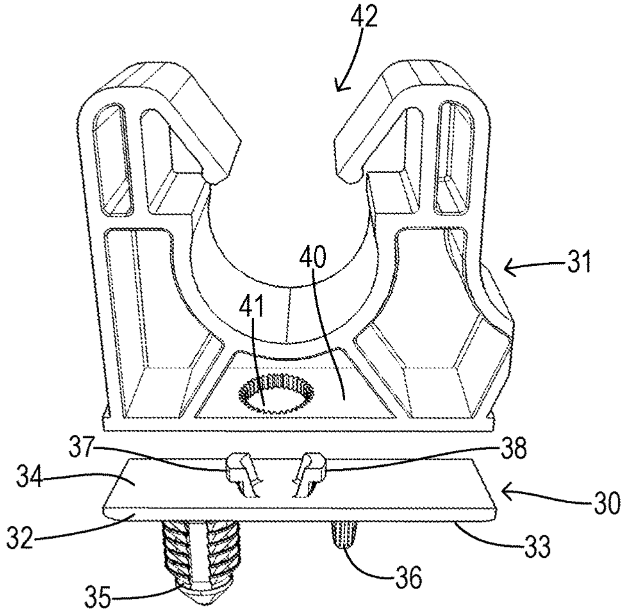
FIG. 6 is an exploded, perspective view of a two-piece mounting system according to a first embodiment of the invention.
Figure 7:
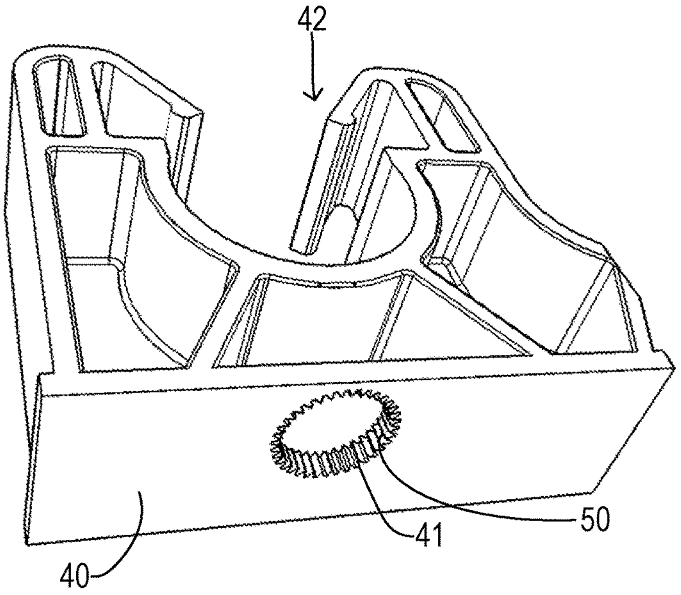
FIG. 7 is a bottom, perspective view of the clip member of FIG. 6.
Figure 8:
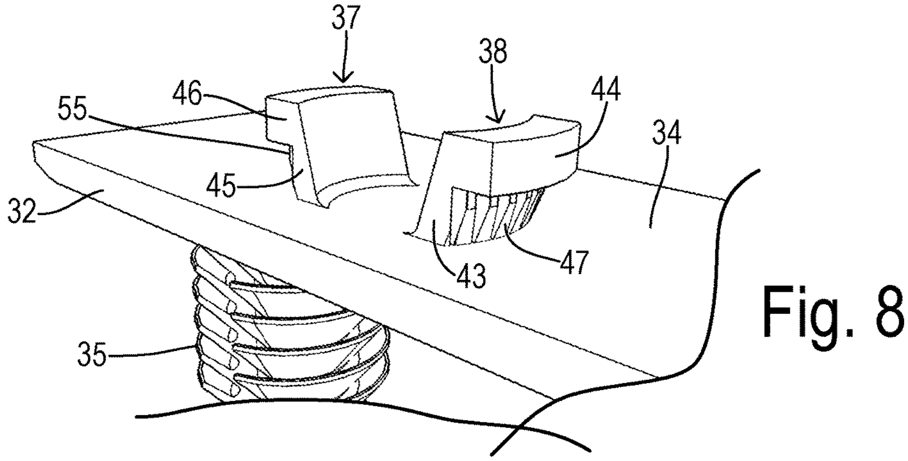
FIG. 8 is a partial bottom, perspective view of the base member of FIG. 6.

The invention avoids the cost, resource utilization, and time delays by adopting a multi-piece bracket design. FIGS. 6-8 show one embodiment of the invention wherein a base member 30 receives a clip member 31 at any one of a plurality of rotational orientations. Base member 30 has a baseplate 32 having a first surface 33 adapted to bear against a vehicle structure and having an opposed second surface 34. A lock pin 35 and an alignment pin 36 extend from first surface 33 in order to engage holes in the vehicle structure and to retain baseplate 32 in a fixed position. Two bendable wings 37 and 38 extend from second surface 34 in order to engage an aperture 41 in an adjustment plate 40 at a bottom end of clip member 31. Surface 34 and plate 40 are shown as being flat. Other conforming shapes which permit rotation could also be used, such as spherical. Plate 40 of clip member 31 supports a clamp 42 for receiving the VBV in the same manner as shown in FIGS. 2 and 3.

Figure 9:
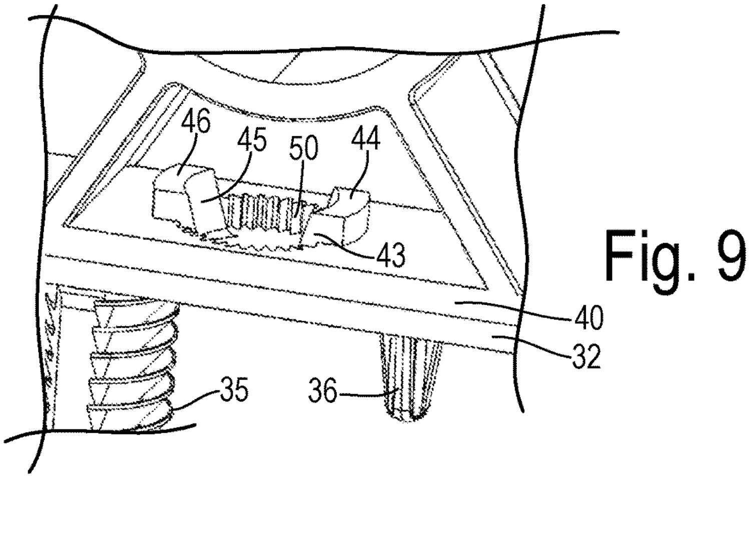
FIG. 9 is a close-up view of the wings of the base member engaging the toothed aperture of the clip member.

Wings 37 and 38 and aperture 41 have a matching profile for selectably locking clip member 31 at one of a plurality of rotational orientations. In this embodiment, aperture 41 has an inner edge 50 forming a continuous ring of gear-like teeth or spurs. Wings 37 and 38 each comprise profile strips 43 and 45, respectively, extending from surface 34 to outer flanges 44 and 46, respectively. Strips 43 and 45 have arcuate toothed surfaces 47 and 55, respectively, for mating with toothed inner edge 50 of aperture 41. The tooth size and spacing is configured to provide a plurality of different rotational orientations at which clip member 31 can be locked. When the toothed surfaces are mated, flanges 44 and 46 capture adjustment plate 40 as shown in FIG. 9. Matching profiles other than toothed spurs could be employed, provided that a rotational symmetry is maintained which allows a desired variety of locked rotational orientations.

Figure 10:
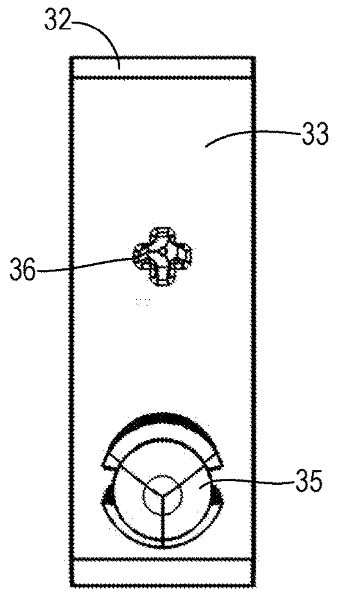
FIG. 10 is a bottom view of the base member.
Figure 11:
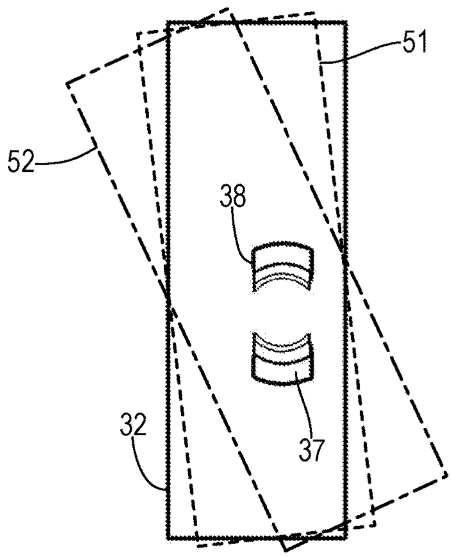
FIG. 11 is a top view of the base member indicating some of the rotational orientations for the clip member on the base member.

FIGS. 10 and 11 show bottom and top view of base member 30. Dashed lines in FIG. 11 show some of the available positions 51 and 52 at which clip member 31 can be locked in place. Toothed surfaces 47 and 55 of wings 37 and 38 are sufficiently engaged against toothed edge 50 that once placed into a position such as position 51 or 52, clip member 31 resists movement out of such position when acted upon by typical forces applied against clamp 42. In other words, the thickness of strips 43 and 45 and the properties of the chosen thermoplastic provide a predetermined stiffness that keeps them in their outboard, rest position. Since base member 30 is fixed in a predefined location based on pins 35 and 36 engaging respective holes in the vehicle structure, clamp 32 is positively retained in a desired orientation and position as determined by the selected tooth engagement.

Figure 12:
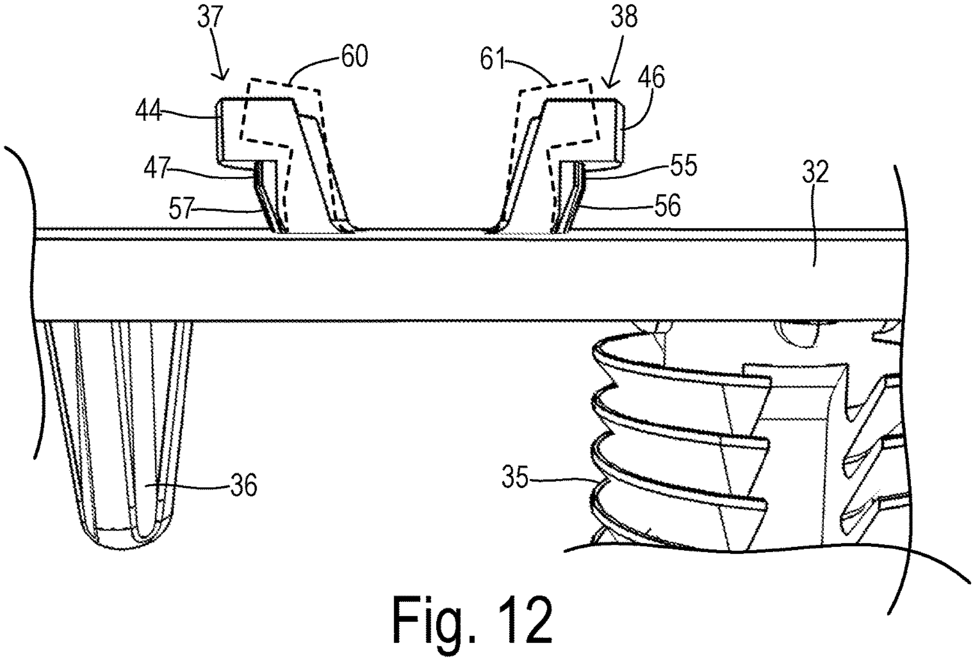
FIG. 12 is a side view of the wings indicating bending which allows rotational adjustment of the clip member.

As shown in FIG. 12, wings 37 and 38 have rest positions shown in solid lines. Wings 37 and 38 are bendable to release positions 60 and 61 shown in dashed lines. Thus, the thickness of strips 43 and 45 and the properties of the chosen thermoplastic also provide sufficient elasticity to allow them to be bent to their inward, release position. In the release position, an effective outside diameter of wings 37 and 38 is achieved which is less than an inside diameter of toothed aperture 41 so that the parts can be assembled together and so that clip member 31 can be rotated to a selected orientation. Wings 37 and 38 can be bent together (i.e., toward each other) by application of a force against flanges 44 and 46 with a tool or manually (e.g., using the fingers). To improve the ability of the toothed surfaces to clear each other and to permit rotation while in the release position, inward conical tapers 56 and 57 may be provided in toothed surfaces 47 and 55 proximate surface 34 of baseplate 32.

What is claimed is:

1. A mounting system for a vapor blocking valve, comprising:

a base member comprised of:

a baseplate having a first surface adapted to bear against a vehicle structure and having an opposed second surface;

a lock pin and an alignment pin extending from the first surface and adapted to engage holes in the vehicle structure to retain the baseplate; and at least two bendable wings extending from the second surface, wherein the wings have a rest position, and wherein the wings are bendable toward one another to a release position; and a clip member comprised of:

an adjustment plate engaging the second surface and having an aperture receiving the wings; and a clamp fixed to the adjustment plate and configured to snap onto the vapor blocking valve;

wherein the wings and the aperture have a matching profile for selectably locking the clip member at one of a plurality of rotational orientations when the wings are at the rest position, and wherein the clip member is movable between rotational orientations with the wings bent to the release position.

2. The system of claim 1 wherein each wing is comprised of a profile strip and an outer flange, wherein the profile strip mates with an inside edge of the aperture, and wherein the outer flange captures the adjustment plate when in the rest position.

3. The system of claim 2 wherein the profile strip and the inside edge define arcuate toothed surfaces to provide the matching profile.

4. The system of claim 3 wherein the toothed surface of the profile strips includes an inward conical taper proximate the baseplate.

5. The system of claim 1 wherein the base member and the clip member are each comprised of molded thermoplastic.

6. The system of claim 1 wherein the lock pin is comprised of a ribbed shank adapted to capture a sheet metal panel of the vehicle structure.

7. A vapor valve bracket comprising:

a baseplate with mounting pins extending from one side and a pair of bendable, toothed wings extending from another side; and a clip supported on the baseplate having a clamp for retaining the valve;

wherein the clip has a toothed aperture configured to receive the wings at a plurality of rotational orientations, the clip being movable between different rotational orientations with the wings bent together to a release position.

* * * * *